US012631800B2

(12) United States Patent
Jiang

(10) Patent No.: US 12,631,800 B2
(45) Date of Patent: May 19, 2026

(54) OPTICAL SYSTEM

(71) Applicant: Changzhou AAC Raytech Optronics Co., Ltd., Changzhou City (CN)

(72) Inventor: Siyuan Jiang, Changzhou (CN)

(73) Assignee: Changzhou AAC Raytech Optronics Co., Ltd., Changzhou City (CN)

( * ) Notice: Subject to any disclaimer, the term of this patent is extended or adjusted under 35 U.S.C. 154(b) by 285 days.

(21) Appl. No.: 18/533,240

(22) Filed: Dec. 8, 2023

(65) Prior Publication Data

US 2025/0044484 A1      Feb. 6, 2025

(51) Int. Cl.
G02B 1/08          (2006.01)
G02B 3/02          (2006.01)

(52) U.S. Cl.
CPC ..................................... G02B 3/02 (2013.01); G02B 1/08 (2013.01)

(58) Field of Classification Search
CPC ..................................... G02B 3/02; G02B 1/08
See application file for complete search history.

(56) References Cited

U.S. PATENT DOCUMENTS

| | | | | |
|---|---|---|---|---|
| 8,767,284 | B2 * | 7/2014 | McDowall | ............. G03B 13/02 |
| | | | | 359/484.01 |
| 10,394,040 | B2 * | 8/2019 | Gollier | ................. G02B 5/3083 |

| | | | | |
|---|---|---|---|---|
| 2017/0269368 | A1 | 9/2017 | Yun et al. | |
| 2018/0101020 | A1 * | 4/2018 | Gollier | ................. G02B 27/022 |
| 2020/0033803 | A1 * | 1/2020 | Christmas | ............ G03H 1/2205 |
| 2020/0341315 | A1 * | 10/2020 | Gollier | ................. G02B 5/3083 |
| 2021/0199967 | A1 * | 7/2021 | Takagi | ............... G02B 27/0172 |
| 2021/0325588 | A1 * | 10/2021 | Wang | ................... G02B 5/0289 |
| 2023/0145287 | A1 * | 5/2023 | Kuzmin | ............... G02B 5/3016 |
| | | | | 349/117 |
| 2023/0300311 | A1 * | 9/2023 | Lu | ........................... G03B 35/08 |
| | | | | 345/419 |
| 2023/0375765 | A1 * | 11/2023 | Tashiro | .............. G02B 27/0093 |
| 2024/0361500 | A1 * | 10/2024 | Seesselberg | ............. G02B 3/02 |

* cited by examiner

*Primary Examiner* — Bumsuk Won
*Assistant Examiner* — John Curtis Sipes
(74) *Attorney, Agent, or Firm* — Wiersch Law Group

(57)          ABSTRACT

The present disclosure relates to the technical field of optical lens and discloses an optical system including, from an anterior side to a posterior side: an image surface, having a circular polarizer attached to a posterior side of the image surface to emit light; a first lens, provided with some reflective elements on an anterior-side surface and a lamination film on a posterior-side surface of the first lens, the lamination film comprising a reflective polarizing film and a quarter waveplate, and the reflective polarizing film provided at a posterior side of the quarter waveplate; and an aperture, located at the posterior side of the optical system; and the optical system further satisfying following conditions: VD≥6 mm; SDmax≤21.2 mm; and 0.71≤d4/TTL≤0.85. The optical system has good optical functions while satisfying a desire of design in a small size and a light weight.

11 Claims, 10 Drawing Sheets

100

100

Lateral Color

μm

300

Lateral Color

μm

OPTICAL SYSTEM

TECHNICAL FIELD

The present disclosure relates to the technical field of near-to-eye display, in particular, to an optical system.

BACKGROUND

With rapid development of the technology related to intelligent headwear devices this year, application of electronic devices equipped with optical lenses has become more widespread, and desires for the optical lenses have become more diverse. Application of optical lenses is growing fast in areas such as virtual reality, augmented reality and hybrid reality. Based on user experience, there is an urgent demand for an optical system having both a small size and an excellent imaging method.

SUMMARY

With regard to the above issues, the objective of the present disclosure is to provide an optical system that has good optical functions while satisfying the desire of design in a small size and a light weight.

In order to address the above issues, embodiments of the present disclosure provide an optical system, from an anterior side to a posterior side: an image surface, having a circular polarizer attached to a posterior side of the image surface to emit light; a first lens, provided with some reflective elements on an anterior-side surface and a lamination film on a posterior-side surface of the first lens, the lamination film comprising a reflective polarizing film and a quarter waveplate, and the reflective polarizing film provided at a posterior side of the quarter waveplate; and an aperture, located at the posterior side of the optical system; and the optical system further satisfying following conditions: $VD \geq 6$ mm; $SDmax \leq 21.2$ mm; and $0.71 \leq d4/TTL \leq 0.85$; where VD denotes a maximum visible diameter of the optical system, SDmax denotes a maximum effective radius of each lens in the optical system, d4 denotes an on-axis distance from the anterior-side surface of the first lens to the image surface; and TTL denotes an on-axis distance from the image surface to the posterior-side surface of the first lens.

As an improvement, the anterior-side surface of the first lens is an aspherical surface.

As an improvement, a posterior-side surface of the first lens is a plane surface.

As an improvement, the optical system satisfies following condition: $90° \leq FOV \leq 110°$; where FOV denotes a field of view of the optical system.

As an improvement, the partially-reflective element is a transflective film, having both a transmissive rate of 40%-60% and a reflective rate of 40%-60%.

As an improvement, the reflective polarizing film has a reflective rate greater than or equal to 95%.

As an improvement, the optical system satisfies following condition: $TTL \leq 24$ mm; where TTL denotes the on-axis distance from the image surface to the posterior-side surface of the first lens.

As an improvement, the optical system satisfies following condition: $TTL/f \leq 1.00$; where TTL denotes the on-axis distance from the image surface to the posterior-side surface of the first lens, and f denotes a focal length of the optical system.

As an improvement, the optical system satisfies following condition: $DIST \leq 35\%$; where DIST denotes an optical distortion of the optical system.

As an improvement, the optical system satisfies following condition: $LC \leq 120$ μm; where LC denotes a chromatic aberration of the optical system.

As an improvement, the image surface is a display having a size of 2.0-2.3 inches.

The present disclosure is advantageous in: by setting the partially-reflective element on the anterior-side surface of the first lens, and by setting on the posterior-side surface of the first lens the lamination film including the reflective polarizing film and the quarter waveplate in order, a pancake-lens structure is achieved, a semi-diameter of a lens is controlled, and the size of the optical system is reduced. Besides, the maximum visible diameter is greater than or equal to 6 mm, so that an optimal display can be achieved by a user without complicated adjustment. In addition, the optical system has a small size but excellent imaging functions.

BRIEF DESCRIPTION OF DRAWINGS

In order to illustrate the technical solutions in the embodiments of the present disclosure more clearly, the drawings used in the description of the embodiments will be briefly described below. It is obvious that the drawings in the following description are only some embodiments of the present disclosure. For those skilled in the art, other drawings may also be obtained in accordance with the drawings without any inventive effort.

DETAILED DESCRIPTION OF EMBODIMENTS

To make the objects, technical solutions, and advantages of the present disclosure clearer, embodiments of the present disclosure are described in detail with reference to accompanying drawings in the following. A person of ordinary skill in the art can understand that, in the embodiments of the present disclosure, many technical details are provided to make readers better understand the present disclosure. However, even without these technical details and any changes and modifications based on the following embodiments, technical solutions required to be protected by the present disclosure can be implemented.

Embodiment 1

Figure 1:
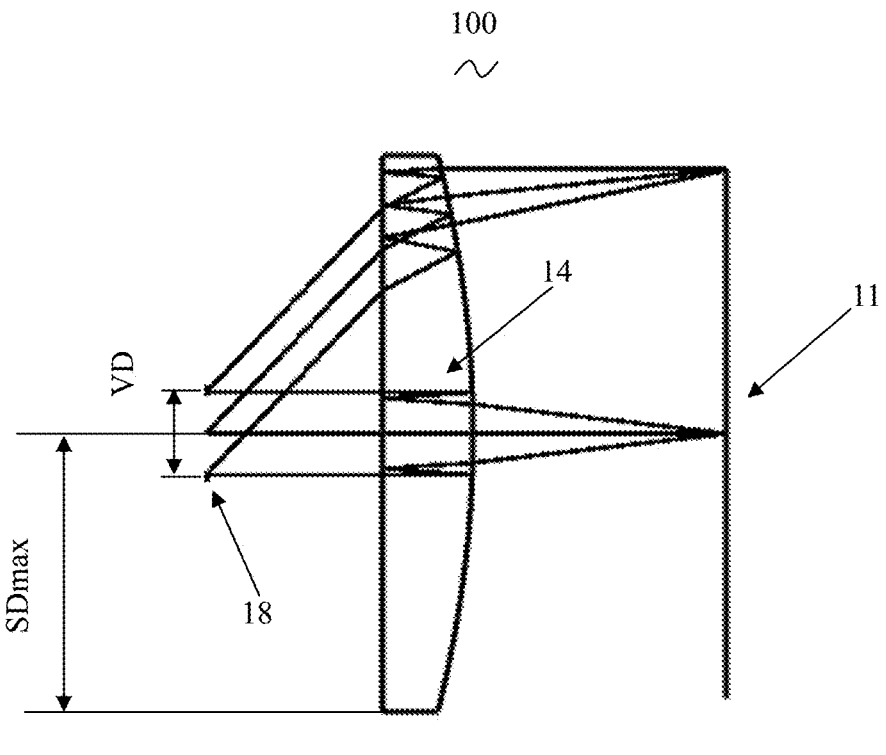
FIG. 1 is a schematic diagram of a structure of an optical system according to Embodiment 1 of the present disclosure.

With reference to FIG. 1, the present disclosure provides an optical system 100 including, from an anterior side to a posterior side: an image surface 11, a circular polarizer 12, a partially-reflective element 13, a first lens 14, a quarter waveplate 15, a reflective polarizing film 16 and an aperture 18.

The image surface 11 is configured to emit light. The image surface 11 has the circular polarizer 12 attached to a posterior side of the image surface 11. In this embodiment, the image surface 11 is a display having a size of 2.1 inches. After light emitted by the display passes the circular polarizer 12, a left-hand circular polarization (LCP) light is formed.

The partially-reflective element 13 is provided on an anterior-side surface 141 of the first lens 14. Partial light is reflected, while partial light is emitted to the first lens 14, and light herein is an LCP light.

A lamination film is provided on a posterior-side surface 142 of the first lens 14, the lamination film including a reflective polarizing film 16 and a quarter waveplate 15. Compared with the quarter waveplate 15, the reflective polarizing film 16 is more distant from the posterior-side surface 142 of the first lens 14. The LCP light is converted to a linearly polarized light S after passing the quarter waveplate 15 for a first time, and then is reflected at the reflective polarizing film 16. At this time, a reflected light is still the linearly polarized light S. The light is converted to the LCP light after passing through the quarter waveplate 15 for a second time, and is then emitted to the first lens 14 for a second time. The light is partially reflected at the partially-reflective element 13. A reflected light is converted to a right-hand circular polarization (RCP) light and is emitted to the first lens L4 for a third time. The RCP light is emitted from the first lens 14 to the quarter waveplate 15, passes the quarter waveplate 15 and is converted to a linearly polarized light P to be emitted to the reflective polarizing film 16. Because the reflective polarizing film 16 has characteristics of reflecting the linearly polarized light S and transmitting the linearly polarized light P, the linearly polarized light P is transmitted to enter the aperture 18.

A position of the aperture 18 is a position of a simulated human-eye surface. A diameter of the aperture 18 is 6 mm.

A maximum visible diameter of the optical system 100 is defined as VD. VD is 6 mm and the optical system 100 satisfies a condition of VD≥6 mm. That is, human eyes are able to see a clear image when moving within a scope of at least 6 mm of a diameter.

An effective radius of the first lens 14 is 20.3 mm, a maximum effective radius of a lens in the optical system 100 is defined as SDmax, and the optical system 100 satisfies a condition of SDmax≤21.2 mm, facilitating reducing a size of the optical system 100.

In this embodiment, a posterior-side surface 142 of the first lens 14 is a plane surface, which is advantageous for improving a yield of lamination film affixing. The anterior-side surface 141 of the first lens 14 is an aspherical surface. Through a design of the aspherical surface, a focus position of a displayed image is adjusted to reduce a chromatic aberration and a distortion of the optical system 100, so as to improve imaging quality. In an alternative embodiment, a free curved surface may be employed for the anterior-side surface 141 of the first lens 14.

In this embodiment, the anterior-side surface 141 of the first lens 14 is a convex surface.

In this embodiment, a field of view of the optical system 100 is defined as FOV, FOV is 100.00°, and the optical system 100 satisfies a condition of 90°≤FOV≤110°. A greater field of view brings about a better user experience. Preferably, the optical system 100 satisfies a condition of 95°≤FOV≤105°.

In this embodiment, the partially-reflective element is a transflective film, having both a transmissive rate of 50% and a reflective rate of 50%. In an alternative embodiment, a ratio of a transmissive rate and a reflective rate of a partially-reflective element may be adjusted as specifically desired, and may be 40:60, 55:45 or 60:40 and so on.

In this embodiment, the reflective polarizing film 16 has a reflective rate greater than or equal to 95%. A higher reflective rate improves light efficiency of the optical system 100 and increases a display luminance.

A total optical length (an on-axis distance from the image surface 11 to the posterior-side surface 172 of the first lens 17) of the optical system 100 is defined as TTL. In this embodiment, TTL is 23.534 mm, and the optical system 100 satisfies a condition of TTL≤24 mm, facilitating reducing the size of the optical system 100.

An on-axis distance from the anterior-side surface of the first lens 14 to the image surface 11 is defined as d4. In this embodiment, d4 is 14.347 mm, d4/TTL is 0.737, satisfying a condition of 0.71≤d4/TTL≤0.85, which is advantageous for reducing the size of the optical system 100.

A focal length of the optical system 100 is defined as f. In this embodiment, f is 24.59 mm, TTL/f is 0.957, and the optical system 100 satisfies a condition of TTL/f≤1.00, facilitating reducing the size of the optical system 100.

A optical distortion of the optical system 100 is defined as DIST. In this embodiment, the optical system 100 satisfies a condition of DIST≤35%. The distortion is small, providing a VR environment that is more realistic.

A chromatic aberration of the optical system 100 is defined as LC. In this embodiment, the optical system 100 satisfies a condition of LC≤120 μm. The small chromatic aberration provides a user with more realistic VR environment.

In the following, examples will be used to describe the optical system 100 of the present disclosure. The symbols recorded in each example will be described as follows. The focal length, on-axis distance, central curvature radius, on-axis thickness, inflexion point position, and arrest point position are all in units of mm.

Design data of the optical system 100 in Embodiment 1 of the present disclosure are shown in Table 1 and Table 2.

TABLE 1

|  | R | d |  | nd |  | vd |
|---|---|---|---|---|---|---|
| Aperture | ∞ | d0= | 12.000 |  |  |  |
| R1 | Infinity | d1= | 6.179 | nd1 | 1.544 v1 | 56.28 |
| R2 | −85.658 | d2= | −6.179 |  |  |  |
| R3 | Infinity | d3= | 6.179 | nd1 | 1.544 v1 | 56.28 |
| R4 | −85.658 | d4= | 17.347 |  |  |  |
| Image Surface | ∞ |  |  |  |  |  |

In the table, meanings of various symbols will be described as follows.

R: curvature radius at a center of an optical surface;

R1: central curvature radius of a posterior-side surface of the first lens 14;

R2: central curvature radius of an anterior-side surface of the first lens 14;

d: on-axis thickness of a lens and an on-axis distance between lenses (in order to facilitate understanding an optical path, a light going from a posterior side to an anterior side is set with a positive value, while a light going from an anterior side to a posterior side is set with a negative value);

d0: on-axis distance from the aperture 18 to the posterior-side surface 142 of the first lens 14;

d1: on-axis thickness of the first lens 14;

d2: negative value of the on-axis thickness of the first lens 14;

d3: on-axis thickness of the first lens 14;

d4: on-axis distance from the anterior-side surface 141 of the first lens 14 to the image surface 11;

nd: refractive index of a d line (the d line is a green light having a wavelength of 550 nm);

nd1: refractive index of the d line of the first lens 14;

vd: abbe number;

v1: abbe number of the first lens 14;

Table 2 shows aspherical surface data of lenses in the optical system 100 in Embodiment 1 of the present disclosure.

However, the present disclosure is not limited to the aspherical polynomials as shown in the formula (1).

$$z = (cr^2)/\left\{1 + \left[1 - (k+1)(c^2 r^2)\right]^{1/2}\right\} + \tag{1}$$
$$A4r^4 + A6r^6 + A8r^8 + A10r^{10} + A12r^{12} + A14r^{14} +$$
$$A16r^{16} + A18r^{18} + A20r^{20} + A22r^{22} + A24r^{24} + A26r^{26}$$

Herein, k is a conic coefficient, A4, A6, A8, A10, A12, A14, A16, A18, A20, A22, A24 and A26 are aspherical surface coefficients, c is a curvature at a center of the optical surface, r is a vertical distance from a point on an aspherical surface curve to the optical axis, and z is an aspherical surface depth (a vertical distance between a point on the aspherical surface which is of the distance of r from the optical axis, and a tangent surface that is tangent with a top point of the optical axis of the aspherical surface).

Figure 2:
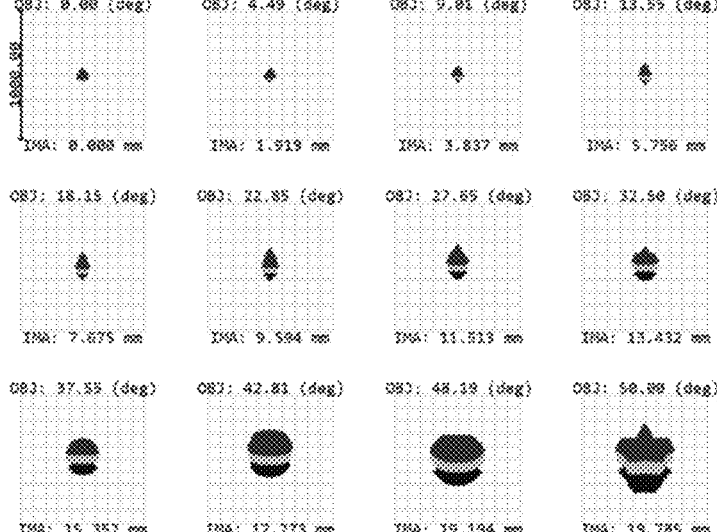
FIG. 2 is a spot diagram of the optical system shown in FIG. 1.
Figure 3:
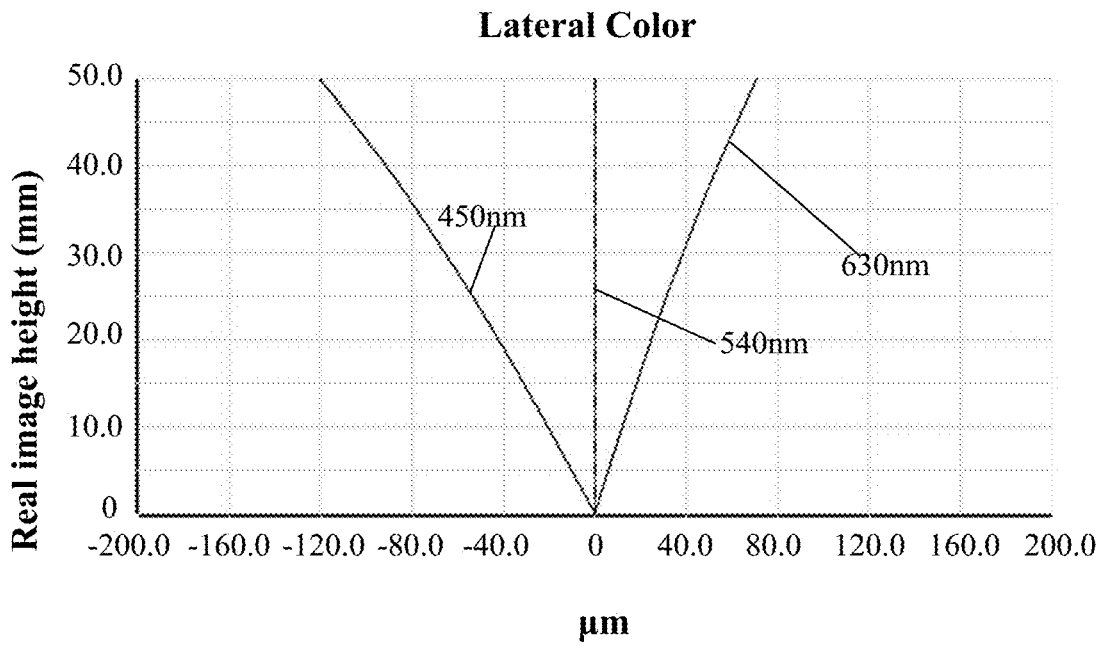
FIG. 3 is a schematic diagram of a lateral color of the optical system shown in FIG. 1.
Figure 4:
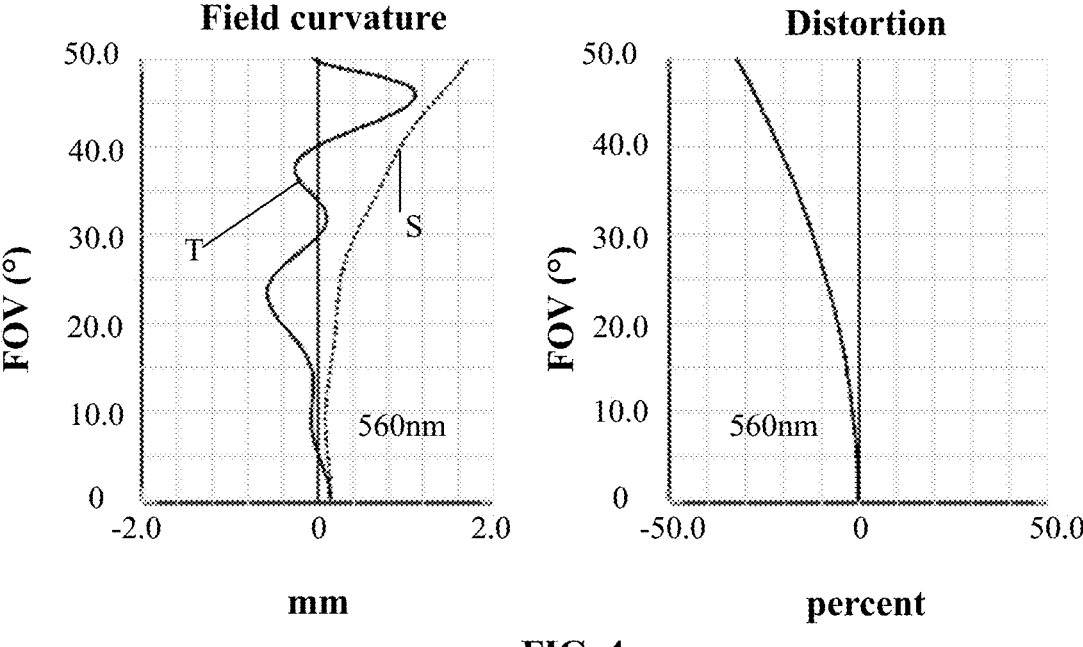
FIG. 4 is a schematic diagram of a field curvature and a distortion of the optical system shown in FIG. 1.
Figure 5:
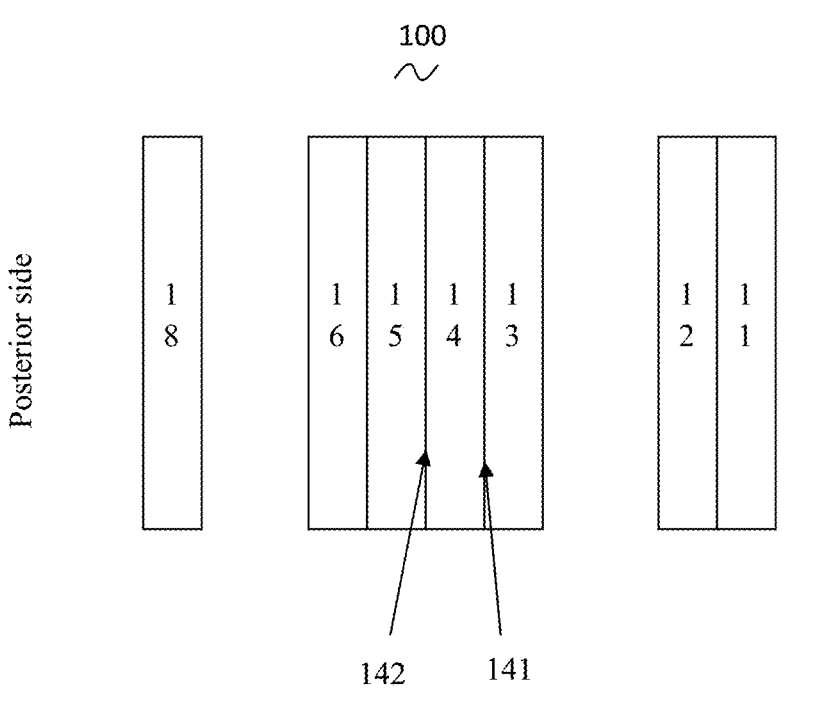
FIG. 5 is a schematic diagram of the optical system shown in FIG. 1 including a film structure.

FIG. 2 and FIG. 3 illustrate a spot diagram and a lateral color diagram of lights having wavelengths of 450 nm, 540 nm and 630 nm after passing the optical system 100 according to Embodiment 1, respectively. FIG. 4 illustrates a field curvature and a distortion of a light having a wavelength of 540 nm after passing the optical system 100 according to Embodiment 1. A field curvature S in FIG. 4 is a field curvature in a sagittal direction, and T is a field curvature in a tangential direction.

In this embodiment, an entrance pupil diameter ENPD of the optical system 100 is 6 mm, TTL is 23.526 mm, d4/TTL is 0.737, the focal length f is 24.59 mm, TTL/f is 0.957, an image height IH of 1.0H is 19.970 mm, and an FOV (field of view) in a diagonal direction is 100.00°. Thus, the optical system 100 satisfies a desire of design in a small size and a maximum visible diameter greater than or equal to 6 mm. Its on-axis and off-axis aberrations are fully corrected, thereby achieving excellent optical characteristics.

Embodiment 2

Embodiment 2 is basically the same as Embodiment 1 and involves symbols having the same meanings as Embodiment 1, and only differences therebetween will be described in the following.

TABLE 2

| | Conic coefficient | Aspherical surface coefficients | | | | |
|---|---|---|---|---|---|---|
| | k | A4 | A6 | A8 | A10 | A12 |
| R1 R2 | −1.88107E+01 | −6.73825E−06 | 1.99372E−07 | −6.32985E−09 | 1.17068E−10 | −1.35282E−12 |
| | Conic coefficient | Aspherical surface coefficients | | | | |
| | k | A14 | A16 | A18 | A20 | A22 |
| R1 R2 | −1.88107E+01 | 1.03410E−14 | −5.38818E−17 | 1.92858E−19 | −4.67328E−22 | 7.33083E−25 |
| | Conic coefficient | Aspherical surface coefficients | | | | |
| | k | | A24 | | A26 | |
| R1 R2 | −1.88107E+01 | | −6.71943E−28 | | 2.73226E−31 | |

For convenience, an aspherical surface of each lens surface is an aspherical surface shown in the below formula (1).

Figure 6:
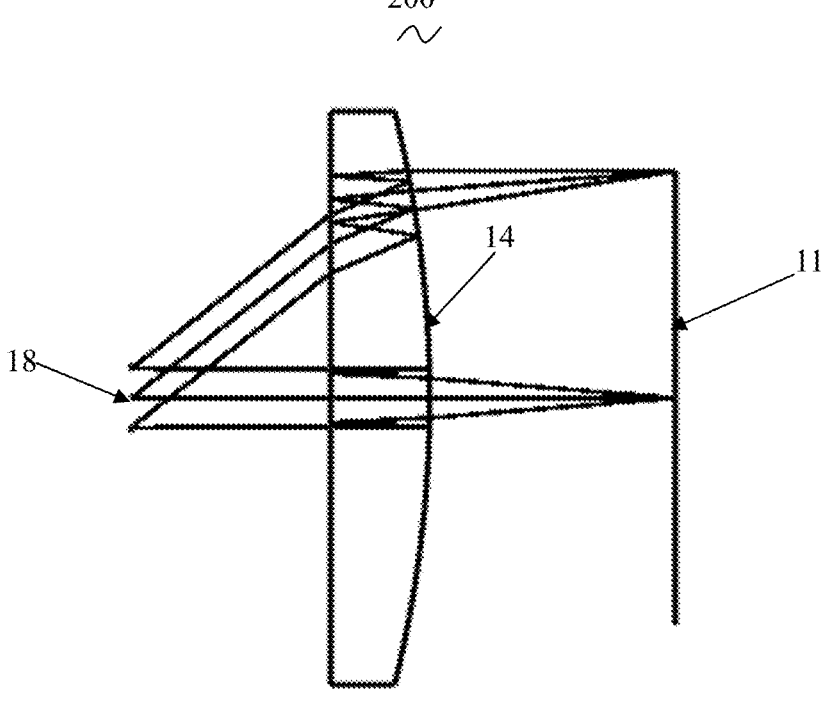
FIG. 6 is a schematic diagram of a partial structure of an optical system according to Embodiment 2 of the present disclosure.

FIG. 6 is an optical system 200 according to Embodiment 2 of the present disclosure.

Table 3 and Table 4 show design data of the optical system 200 in Embodiment 2 of the present disclosure.

TABLE 3

| | R | | d | | nd | | vd |
|---|---|---|---|---|---|---|---|
| Aperture | ∞ | d0= | 13.000 | | | | |
| R1 | Infinity | d1= | 6.505 | nd1 | 1.5444 | v1 | 56.28 |
| R2 | −83.106 | d2= | −6.505 | | | | |
| R1 | Infinity | d3= | 6.505 | nd1 | 1.5444 | v1 | 56.28 |
| R2 | −83.106 | d4= | 16.022 | | | | |
| Image Surface | ∞ | | | | | | |

Table 4 shows aspherical surface data of lenses in the optical system 200 in Embodiment 2 of the present disclosure.

TABLE 4

| | Conic coefficient | Aspherical surface coefficients | | | | |
|---|---|---|---|---|---|---|
| | k | A4 | A6 | A8 | A10 | A12 |
| R1 | | | | | | |
| R2 | −2.90944E+00 | −2.27480E−06 | 4.88820E−08 | −7.72720E−10 | 7.77630E−12 | −5.08650E−14 |

| | Conic coefficient | Aspherical surface coefficients | | | | |
|---|---|---|---|---|---|---|
| | k | A14 | A16 | A18 | A20 | A22 |
| R1 | | | | | | |
| R2 | −2.90944E+00 | 2.10190E−16 | −4.88980E−19 | 4.48480E−22 | −1.55150E−25 | 2.59850E−27 |

| | Conic coefficient | Aspherical surface coefficients | |
|---|---|---|---|
| | k | A24 | A26 |
| R1 | | | |
| R2 | −2.90944E+00 | −4.96170E−30 | −1.44370E−32 |

Figure 7:
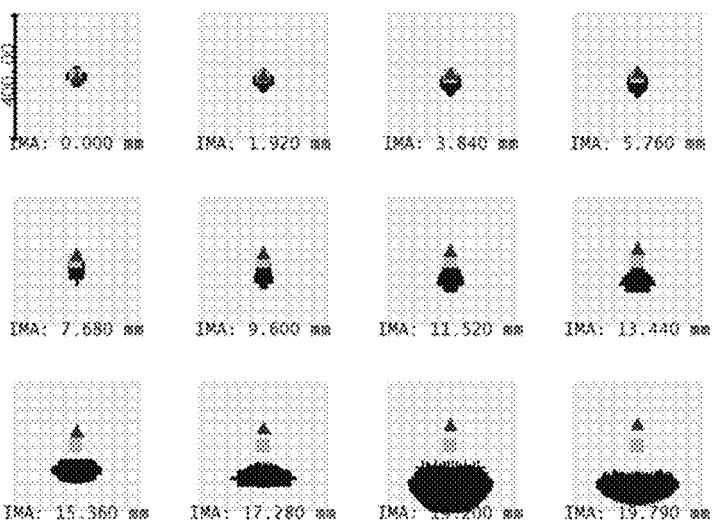
FIG. 7 is a spot diagram of the optical system shown in FIG. 6.
Figure 8:
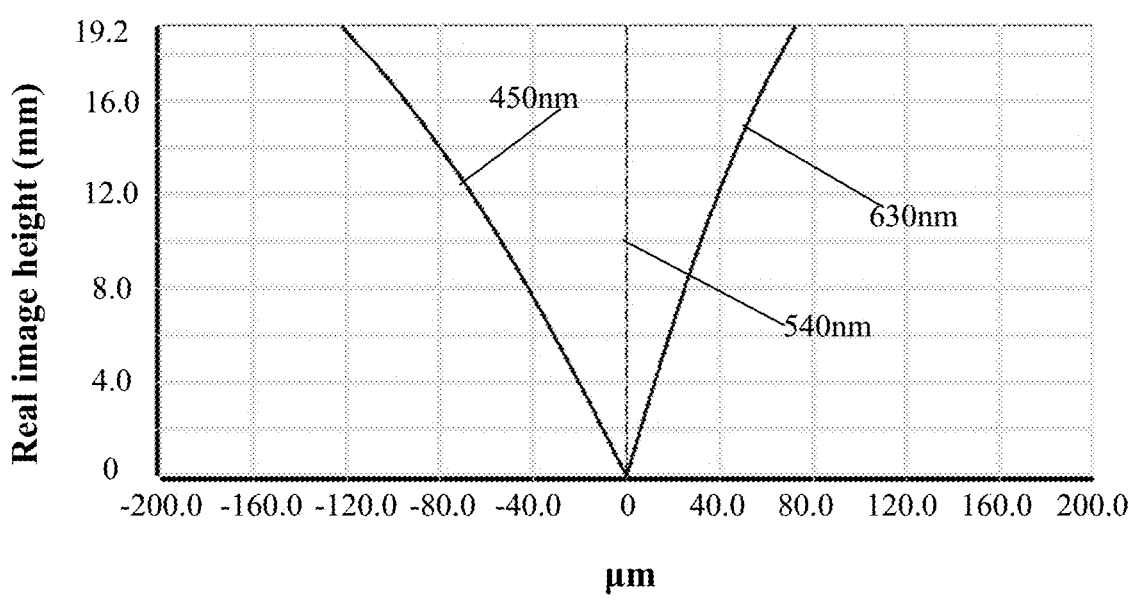
FIG. 8 is a schematic diagram of a lateral color of the optical system shown in FIG. 6.
Figure 9:
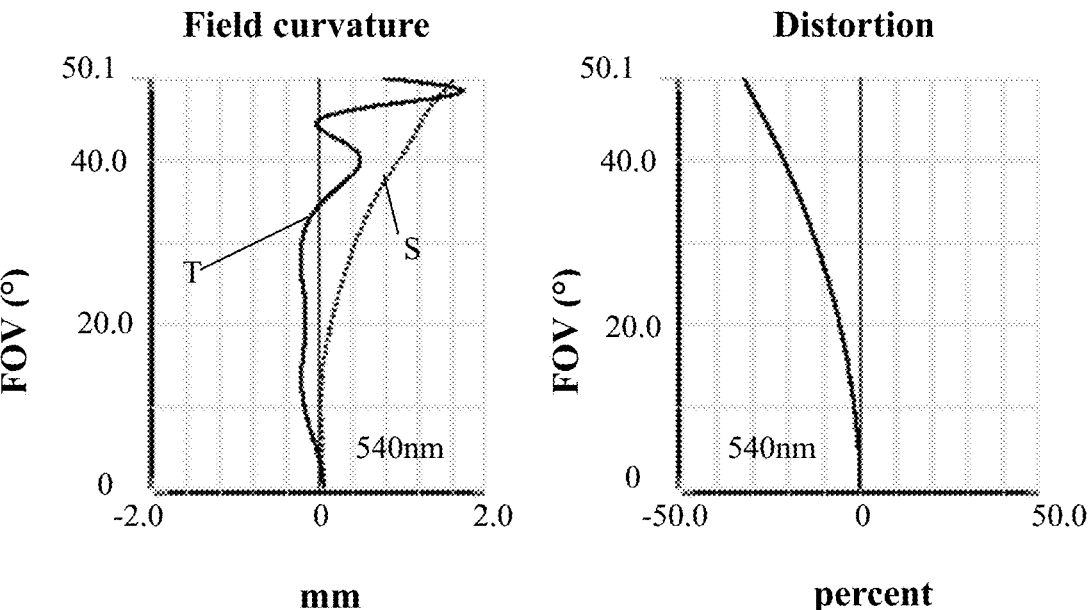
FIG. 9 is a schematic diagram of a field curvature and a distortion of the optical system shown in FIG. 6.
Figure 10:
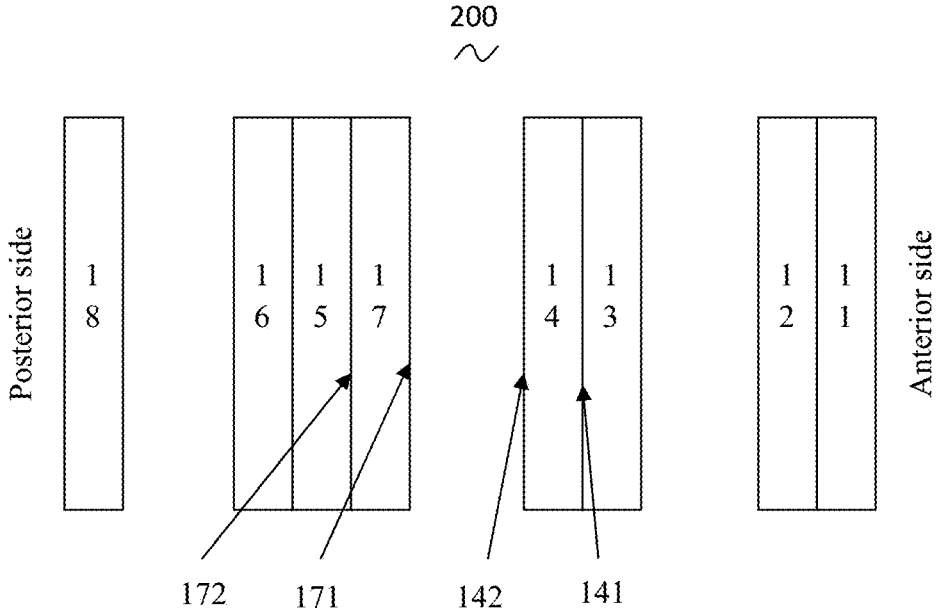
FIG. 10 is a schematic diagram of the optical system shown in FIG. 6 including a film structure.

FIG. 7 and FIG. 8 illustrate a spot diagram and a lateral color diagram of lights having wavelengths of 450 nm, 540 nm and 630 nm after passing the optical system 200 according to Embodiment 2, respectively. FIG. 9 illustrates a field curvature and a distortion of a light having a wavelength of 540 nm after passing the optical system 200 according to Embodiment 2. A field curvature S in FIG. 9 is a field curvature in a sagittal direction, and T is a field curvature in a tangential direction.

In this embodiment, an entrance pupil diameter ENPD of the optical system 200 is 6 mm, TTL is 22.528 mm, d4/TTL is 0.711, the maximum effective radius SDmax of a lens in the optical system 200 is 19.5 mm, the focal length f is 23.956 mm, TTL/f is 0.94, an image height IH of 1.0H is 19.200 mm, and an FOV (field of view) in a diagonal direction is 103.89°. Thus, the optical system 200 satisfies a design requirement in a small size and a maximum visible diameter greater than or equal to 6 mm. Its on-axis and off-axis aberrations are fully corrected, thereby achieving outstanding optical characteristics.

Embodiment 3

Embodiment 3 is basically the same as Embodiment 1 and involves symbols having the same meanings as Embodiment 1, and only differences therebetween will be described in the following.

Figure 11:
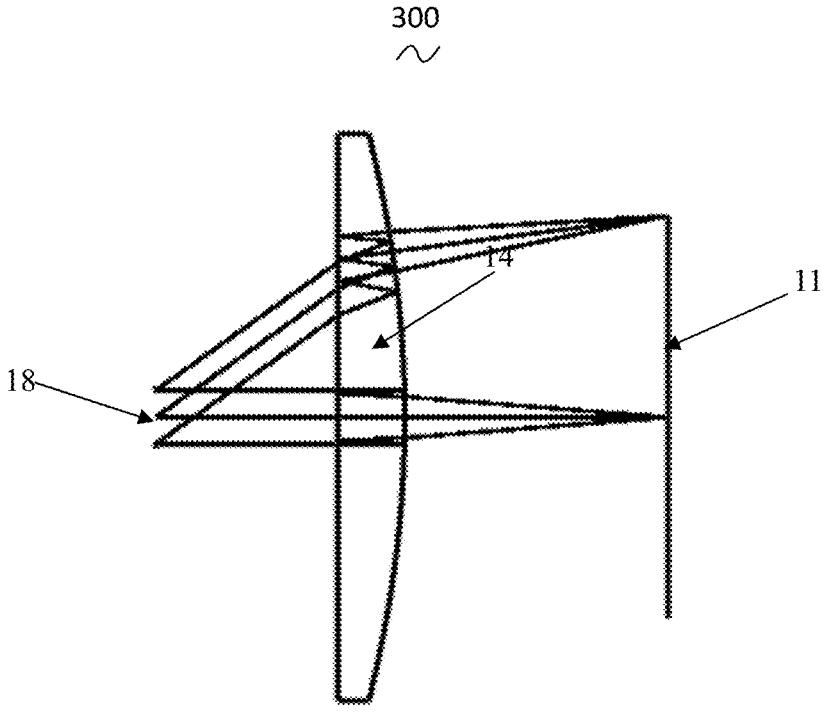
FIG. 11 is a schematic diagram of a structure of an optical system according to Embodiment 3 of the present disclosure.

FIG. 11 is an optical system 300 according to Embodiment 3 of the present disclosure.

Table 5 and Table 6 show design data of the optical system 300 in Embodiment 3 of the present disclosure.

TABLE 5

| | R | | d | | nd | | vd |
|---|---|---|---|---|---|---|---|
| Aperture | ∞ | d0= | 13.000 | | | | |
| R1 | Infinity | d1= | 4.754 | nd1 | 1.5444 | v1 | 56.28 |
| R2 | −86.755 | d2= | −4.754 | | | | |
| R1 | Infinity | d3= | 4.754 | nd1 | 1.5444 | v1 | 56.28 |
| R2 | −86.755 | d4= | 18.776 | | | | |
| Image Surface | ∞ | | | | | | |

Table 6 shows aspherical surface data of lenses in the optical system 300 in Embodiment 3 of the present disclosure.

TABLE 6

| | Conic coefficient | Aspherical surface coefficients | | | | |
|---|---|---|---|---|---|---|
| | k | A4 | A6 | A8 | A10 | A12 |
| R1 | | | | | | |
| R2 | −1.54107E+01 | −6.28930E−06 | 1.99230E−07 | −6.34920E−09 | 1.17100E−10 | −1.35270E−12 |

| | Conic coefficient | Aspherical surface coefficients | | | | |
|---|---|---|---|---|---|---|
| | k | A14 | A16 | A18 | A20 | A22 |
| R1 | | | | | | |
| R2 | −1.54107E+01 | 1.03410E−14 | −5.38820E−17 | 1.92850E−19 | −4.67340E−22 | 7.33050E−25 |

TABLE 6-continued

| Conic coefficient | Aspherical surface coefficients | |
| --- | --- | --- |
| k | A24 | A26 |
| R1 | | |
| R2 −1.54107E+01 | −6.71790E−28 | 2.73340E−31 |

Figure 12:
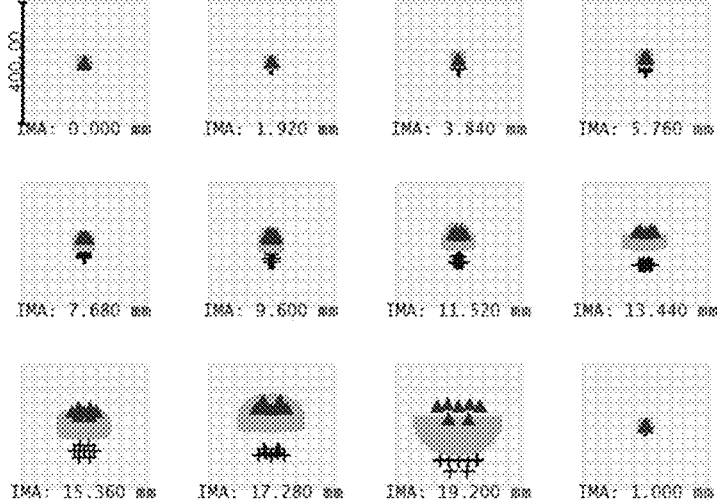
FIG. 12 is a spot diagram of the optical system shown in FIG. 11.
Figure 13:
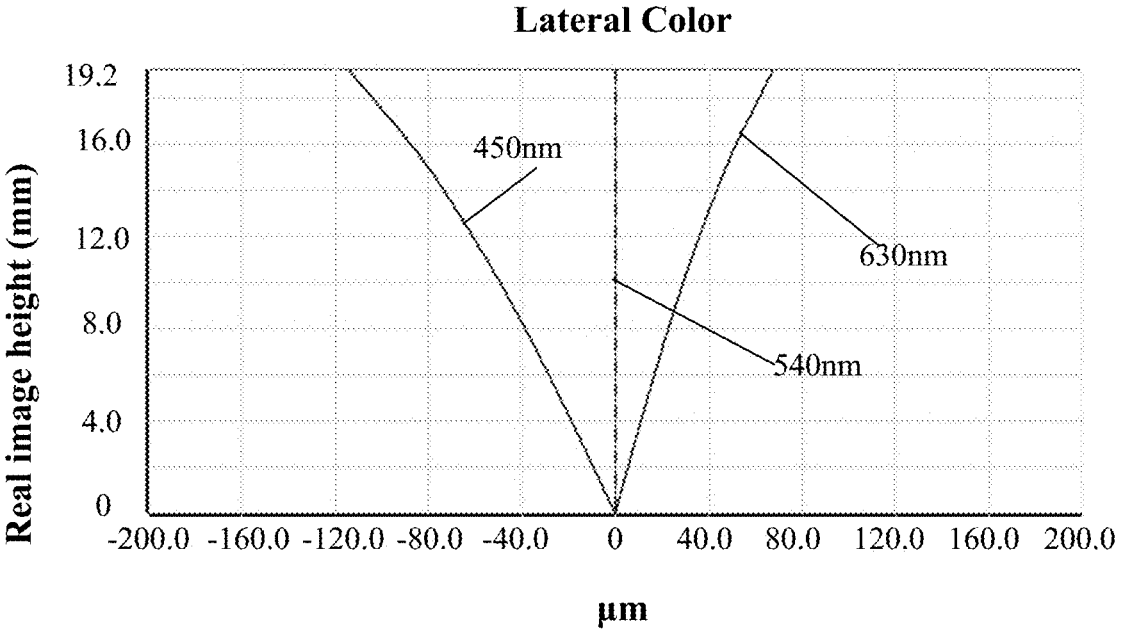
FIG. 13 is a schematic diagram of a lateral color of the optical system shown in FIG. 11.
Figure 14:
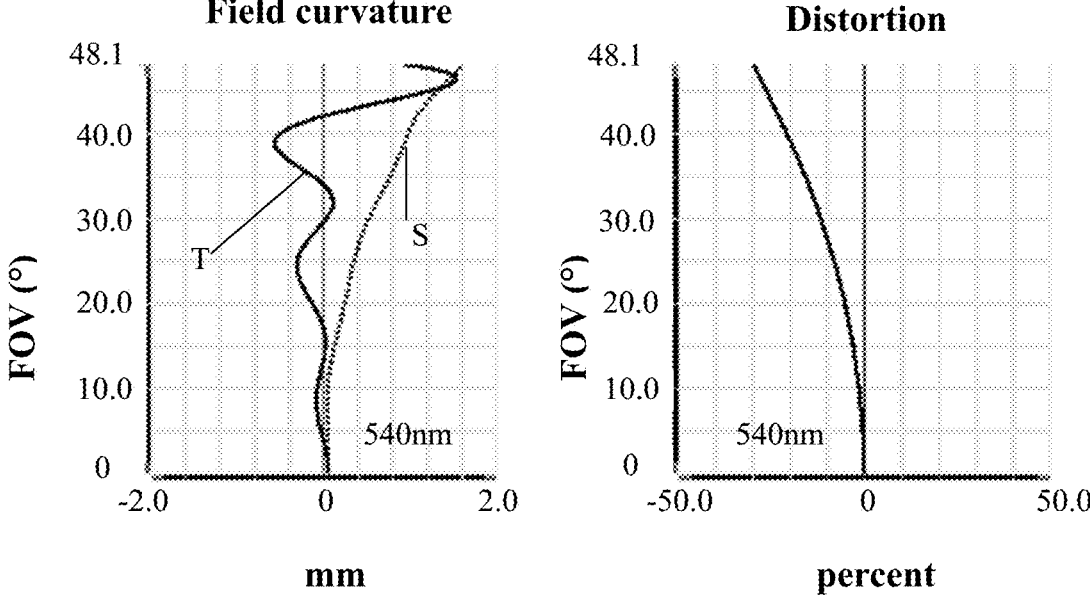
FIG. 14 is a schematic diagram of a field curvature and a distortion of the optical system shown in FIG. 11.
Figure 15:
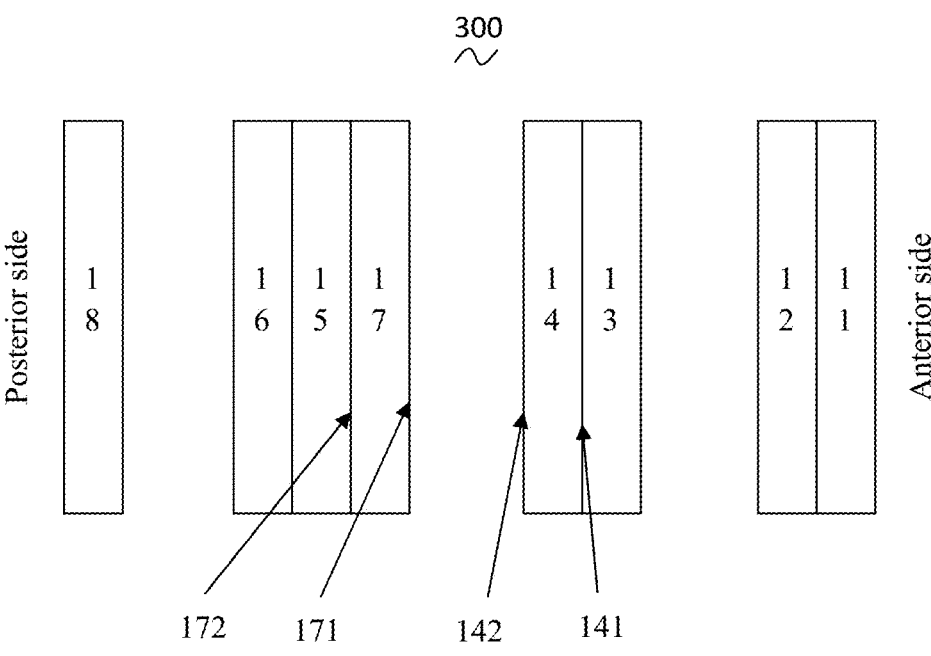
FIG. 15 is a schematic diagram of the optical system shown in FIG. 11 including a film structure.

FIG. 12 and FIG. 13 illustrate a spot diagram and a lateral color diagram of lights having wavelengths of 450 nm, 540 nm and 630 nm after passing the optical system 300 according to Embodiment 3, respectively. FIG. 14 illustrates a field curvature and a distortion of a light having a wavelength of 540 nm after passing the optical system 300 according to Embodiment 3. A field curvature S in FIG. 14 is a field curvature in a sagittal direction, and T is a field curvature in a tangential direction.

In this embodiment, an entrance pupil diameter ENPD of the optical system 300 is 6 mm, TTL is 23.530 mm, d4/TTL TABLE 7-continued

| | R | d | | nd | | vd | |
| --- | --- | --- | --- | --- | --- | --- | --- |
| R1 | Infinity | d3= | 6.505 | nd1 | 1.5444 | v1 | 56.28 |
| R2 | −83.106 | d4= | 16.022 | | | | |
| Image Surface | ∞ | | | | | | |

Table 8 shows aspherical surface data of lenses in the optical system 400 in Embodiment 4 of the present disclosure.

TABLE 8

| Conic coefficient | Aspherical surface coefficients | | | | |
| --- | --- | --- | --- | --- | --- |
| k | A4 | A6 | A8 | A10 | A12 |
| R1 | | | | | |
| R2 −2.90944E+00 | −2.27480E−06 | 4.88820E−08 | −7.72720E−10 | 7.77630E−12 | −5.08650E−14 |

| Conic coefficient | Aspherical surface coefficients | | | | |
| --- | --- | --- | --- | --- | --- |
| k | A14 | A16 | A18 | A20 | A22 |
| R1 | | | | | |
| R2 −2.90944E+00 | 2.10190E−16 | −4.88980E−19 | 4.48480E−22 | −1.55150E−25 | 2.59850E−27 |

| Conic coefficient | Aspherical surface coefficients | |
| --- | --- | --- |
| k | A24 | A26 |
| R1 | | |
| R2 −2.90944E+00 | −4.96170E−30 | −1.44370E−32 | is 0.798, the maximum effective radius SDmax of a lens in the optical system 300 is 21.2 mm, the focal length f is 24.643 mm, TTL/f is 0.955, an image height IH of 1.0H is 19.200 mm, and an FOV (field of view) in a diagonal direction is 96.29°. Thus, the optical system 300 satisfies a design requirement in a small size and a maximum visible diameter greater than or equal to 6 mm. Its on-axis and off-axis aberrations are fully corrected, thereby achieving outstanding optical characteristics.

Embodiment 4

Embodiment 4 is basically the same as Embodiment 1 and involves symbols having the same meanings as Embodiment 1, and only differences therebetween will be described in the following.

Figure 16:
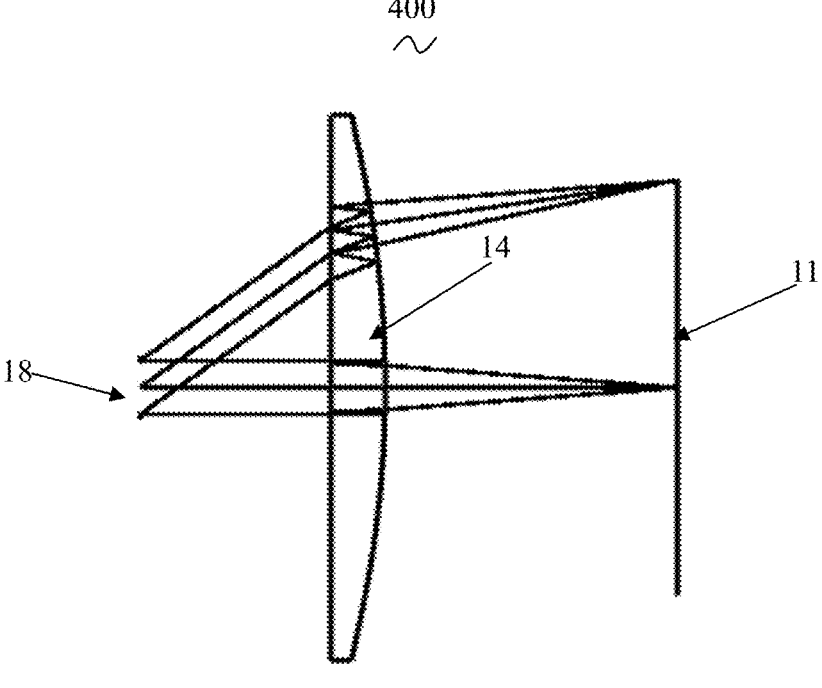
FIG. 16 is a schematic diagram of a partial structure of an optical system according to Embodiment 4 of the present disclosure.

FIG. 16 is an optical system 400 according to Embodiment 4 of the present disclosure.

Table 7 and Table 8 show design data of the optical system 400 in Embodiment 4 of the present disclosure.

TABLE 7

| | R | d | | nd | | vd | |
| --- | --- | --- | --- | --- | --- | --- | --- |
| Aperture | ∞ | d0= | 13.000 | | | | |
| R1 | Infinity | d1= | 6.505 | nd1 | 1.5444 | v1 | 56.28 |
| R2 | −83.106 | d2= | −6.505 | | | | |

Figure 17:
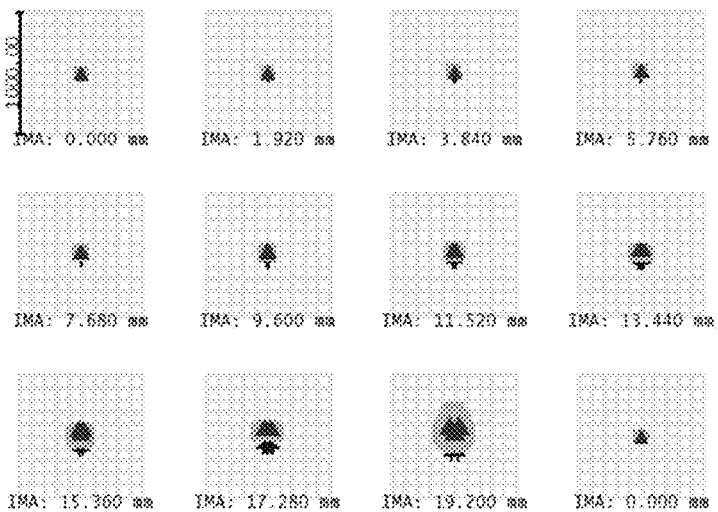
FIG. 17 is a spot diagram of the optical system shown in FIG. 16.
Figure 18:
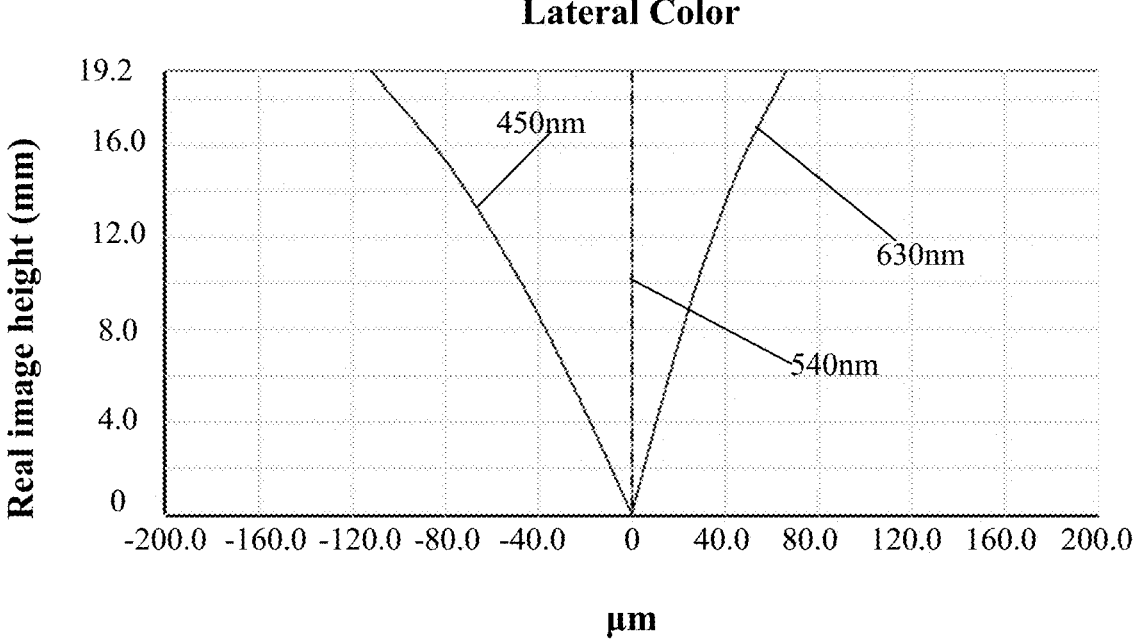
FIG. 18 is a schematic diagram of a lateral color of the optical system shown in FIG. 16.
Figure 19:
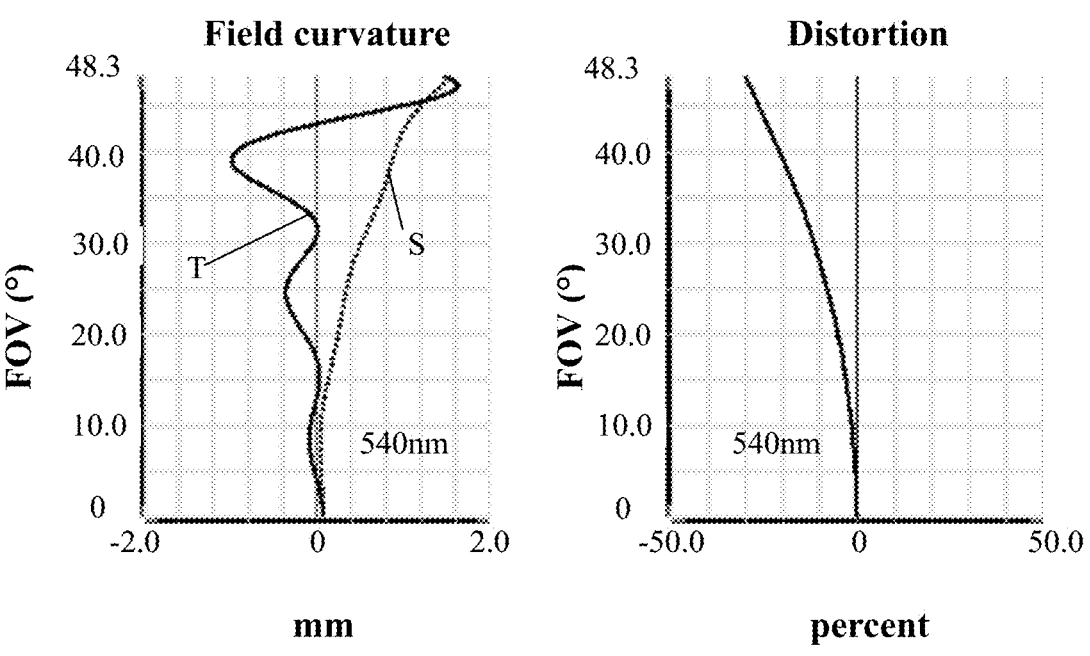
FIG. 19 is a schematic diagram of a field curvature and a distortion of the optical system shown in FIG. 16.
Figure 20:
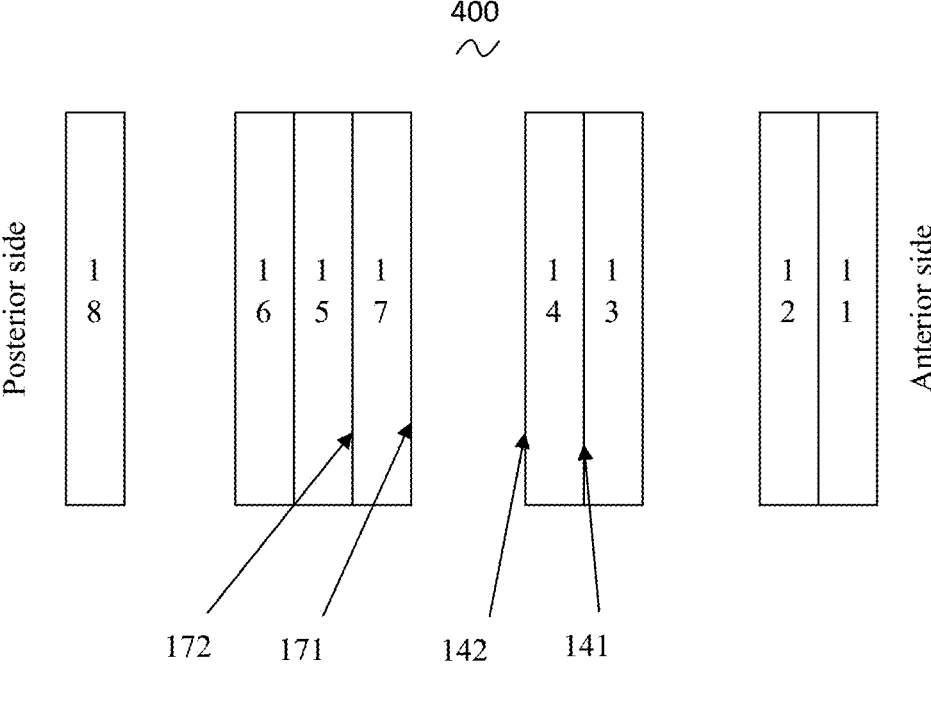
FIG. 20 is a schematic diagram of the optical system shown in FIG. 16 including a film structure.

FIG. 17 and FIG. 18 illustrate a spot diagram and a lateral color diagram of lights having wavelengths of 450 nm, 540 nm and 630 nm after passing the optical system 400 according to Embodiment 4, respectively. FIG. 19 illustrates a field curvature and a distortion of a light having a wavelength of 540 nm after passing the optical system 400 according to Embodiment 4. A field curvature S in FIG. 19 is a field curvature in a sagittal direction, and T is a field curvature in a tangential direction.

In this embodiment, an entrance pupil diameter ENPD of the optical system 400 is 6 mm, TTL is 23.664 mm, d4/TTL is 0.843, the maximum effective radius SDmax of a lens in the optical system 400 is 20.3 mm, the focal length f is 24.617 mm, TTL/f is 0.961, an image height IH of 1.0H is 19.200 mm, and an FOV (field of view) in a diagonal direction is 96.58°. Thus, the optical system 400 satisfies a design requirement in a small size and a maximum visible diameter greater than or equal to 6 mm. Its on-axis and off-axis aberrations are fully corrected, thereby achieving outstanding optical characteristics.

It can be appreciated by one having ordinary skill in the art that the description above is only embodiments of the present disclosure. In practice, one having ordinary skill in the art can make various modifications to these embodiments in forms and details without departing from the scope of the present disclosure.

What is claimed is:

1. An optical system comprising, from an anterior side to a posterior side:

an image surface, having a circular polarizer attached to a posterior side of the image surface to emit light;

a first lens, provided with some reflective elements on an anterior-side surface and a lamination film on a posterior-side surface of the first lens, the lamination film comprising a reflective polarizing film and a quarter waveplate, and the reflective polarizing film provided at a posterior side of the quarter waveplate; and an aperture, located at the posterior side of the optical system; and the optical system further satisfying following conditions:

$$VD \geq 6 \text{ mm};$$

$$SDmax \leq 21.2 \text{ mm; and}$$

$$0.71 \leq d4/TTL \leq 0.85;$$

where

VD denotes a maximum visible diameter of the optical system,

SDmax denotes a maximum effective radius of each lens in the optical system, d4 denotes an on-axis distance from the anterior-side surface of the first lens to the image surface; and TTL denotes an on-axis distance from the image surface to the posterior-side surface of the first lens.

2. The optical system according to claim 1, wherein the anterior-side surface of the first lens is an aspherical surface.

3. The optical system according to claim 1, wherein a posterior-side surface of the first lens is a plane surface.

4. The optical system according to claim 1, satisfying following condition:

$$90° \leq FOV \leq 110°;$$

where

FOV denotes a field of view of the optical system.

5. The optical system according to claim 1, wherein the partially-reflective element is a transflective film, having both a transmissive rate of 40%-60% and a reflective rate of 40%-60%.

6. The optical system according to claim 1, wherein the reflective polarizing film has a reflective rate greater than or equal to 95%.

7. The optical system according to claim 1, satisfying following condition:

$$TTL \leq 24 \text{ mm.}$$

8. The optical system according to claim 1, satisfying following condition:

$$TTL/f \leq 1.00;$$

where f denotes a focal length of the optical system.

9. The optical system according to claim 1, satisfying following condition:

$$DIST \leq 35\%;$$

where

DIST denotes an optical distortion of the optical system.

10. The optical system according to claim 1, satisfying following condition:

$$LC \leq 120 \text{ μm};$$

where

LC denotes a chromatic aberration of the optical system.

11. The optical system according to claim 1, wherein the image surface is a display having a size of 2.0-2.3 inches.

\* \* \* \* \*